Patented Aug. 6, 1929.

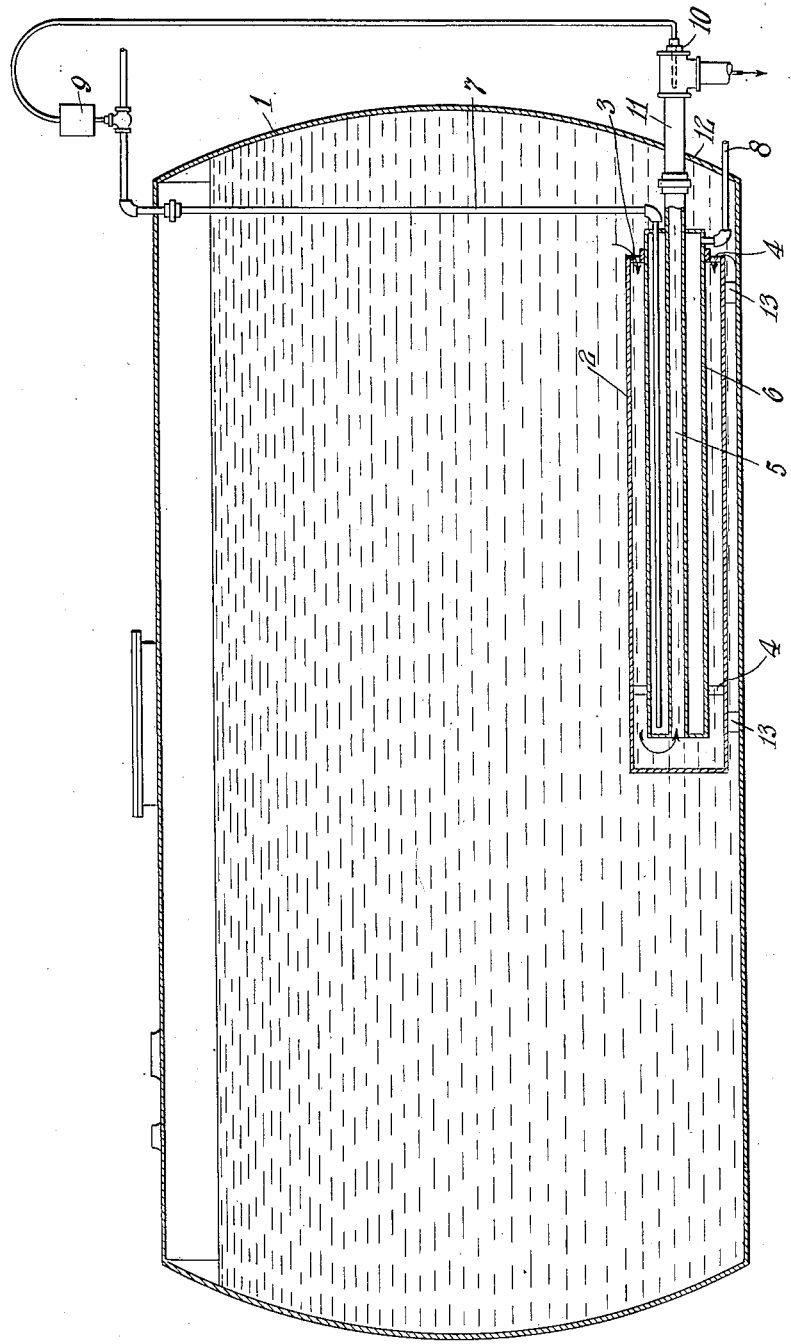

1,723,082

UNITED STATES PATENT OFFICE.

ALFRED F. SCHUMANN, OF BALTIMORE, MARYLAND, ASSIGNOR TO HAUCK MANUFACTURING COMPANY, OF BROOKLYN, NEW YORK, A CORPORATION OF NEW YORK.

LIQUID-HEATING APPARATUS.

Application filed November 23, 1927. Serial No. 235,161.

The invention relates to a heater to be associated with tanks designed, more especially, to retain contents which are slow-flowing or more or less viscous particularly at reduced temperatures, such, for example, as heavy oils, asphalt, tars, etc.

Heretofore, in the application of heating devices to tanks of this type, the arrangement has been such as to necessitate the heating of practically the entire contents of a tank; or, provision has been made for installing heating means merely in connection with the discharge member of the tank. In the former construction, it is thus necessary to maintain substantially the entire body of material heated, this requiring a continuous application of heat and causing usually a separation of the lighter elements, which is particularly objectionable, for example, in the case of asphalt due to loss in its penetrating power. Moreover, the hotter material rises to the top of the tank, actual tests showing as great a variation as 140° F. at the top to 65° F. at the bottom, which makes it difficult, also, to control the temperature of the material being withdrawn at said bottom. In many instances this prevents, also, attaining the required temperature at the outlet for withdrawing liquid at the bottom when the operation is conducted under a gravity or suction feed. Furthermore, an appreciable radiation loss from the large body of heated material occurs, reducing materially efficiency of operation.

The present invention has for its object to obviate these difficulties; and to afford a system whereby substantially instantaneous heating of the material at the discharge portion of its container is attained with consequent rapid delivery of said material. It embodies a device contained wholly within the contents of the tank, which will rapidly bring about delivery of the said contents at proper temperature and with a large saving in cost of the heating, the same being accomplished, also, under perfect control and with no separation of lighter elements occurring. A further object of the invention resides in the provision of means for automatically controlling the supply of the heating medium employed to effect delivery of the contents at the proper temperature.

In accordance with the invention, only a very small portion of the total volume of the contents is directly exposed to the heating means which is located, furthermore, in close proximity to the point of discharge of the tank, the discharge elements, moreover, constituting a part of the heating means. To this end, the invention contemplates the provision of a casing substantially along the bottom of the tank and adjacent a wall thereof for confining a predetermined quantity of the total contents of the tank, said casing being open at one end for communication freely with the tank contents. The said casing retains, also, a combined heating and discharge element located axially therein and embodying a tubular distributing member disposed centrally and coaxially within said casing and including a surrounding steam jacket or other heating medium suitable for imparting the desired degree of temperature to the material surrounding and within the same. The said distributing member, moreover, is open at both ends, the inner end being designed to be in communication with the interior of the said casing, while the outer end extends through the adjacent wall of the tank for external connection and by means of which the contents of the tank may be withdrawn and at the desired temperature. Thermostatic means subjected to the temperature of the delivered material are provided to this end to regulate the supply of the heating medium so that the desired temperature of said delivered material is substantially maintained. It will be observed that, as a result of the foregoing arrangement, the said contents in small portions only are compelled to travel a circuitous path about and through the heating means, being exposed thus to a maximum extent to the heat of said jacket which consequently facilitates the flow in rapidly and effectively liquefying the contents so that they may be readily withdrawn and in proper condition for use.

The nature of the invention, however, will best be understood when described in connection with the accompanying drawing, which is a longitudinal vertical section through a tank equipped with the novel heater device.

Referring to the drawing, 1 designates a suitable container or tank of suitable size and construction and designed to store material of a more or less liquid nature, such as heavy oils, asphalt, tars, etc. which, as is well known, have a tendency to solidify or become viscous at reduced temperatures, and are then slow-flowing or even cease entirely to flow. The invention resides in providing wholly within such tank a suitable heating means for successive portions of the said contents and whereby the viscosity thereof is reduced sufficiently to insure a continued flow from the tank. The novel arrangement includes the location of the said means substantially at the bottom of the tank 1 with outlet near one of the sides or ends thereof, or discharge point of the tank, as indicated.

One suitable form of such means is indicated in the drawing and comprises a casing or shell 2 supported as on the bottom of tank 1 and open at the one end 3 so as to afford free communication with the interior of said tank and permit a limited portion of the contents thereof to flow therein. Within said shell is axially mounted, as by the spacing washers or clamp members 4, a heating device and distributor for the liquid, the same comprising a tubular member 5 open at both ends and surrounded by heating means as, for example, the casing or jacket 6. Into the latter steam or other suitable heating fluid is directed through a pipe 7, extending substantially to its inner end, and is removed through an outlet pipe 8 at the rear end thereof, said pipe serving also to remove any condensation when steam is employed for heating. The supply of steam to the jacket 6 may be thermostatically regulated as through the provision of a valve device 9 of any well known or special design and included in the steam line, said valve in turn being controlled by a thermostatic device 10 installed conveniently in the portion 11 of member 5 and extending beyond the tank.

As stated, the inner end of this distributing member 5 is open and thus communicates freely with the interior of casing 2 at its inner portion, while at the outer end of said casing the distributing member is extended to project through and beyond a wall or end 12 of the tank to afford the portion 11 for outside connection so that the contents may conveniently be removed therefrom in any suitable manner, as by gravity or a suitable pump or like means (not shown).

It will be noted that the said heating apparatus occupies but a small portion of the tank capacity and may be readily applied to said tank as through supports 13 secured to the bottom 11; and the arrangement, furthermore, is such that the contents of the tank before being delivered therefrom through the outlet portion 11 are constrained to a circuitous path and thus exposed at least twice to the action of the heating means or jacket 6. By this expedient, a substantial and rapid heating of a small portion of the contents is attained to provide for a satisfactory liquid condition thereof so that they may readily and substantially instantaneously be withdrawn from the said tank as through the outlet portion 11. It will be observed, also, that substantially only the amount contained within the casing 2 is at any one time heated to any considerable extent and that an appreciable saving in the cost of heating is thereby attained, especially when it is not desired to discharge the entire contents of the tank. Incidental heat transmitted to that portion of the contents immediately surrounding the heating device assists, also, in promoting flow of the oil and the like into the casing or shell 2 where it is brought to the necessary condition for discharge. A much quicker action is had, also, by the novel arrangement in that it is not necessary first to heat the entire contents of the tank to induce a flow; and there is no tendency, moreover, toward the separation of the lighter elements of certain of the liquids which may be stored in a tank of this nature.

I claim:

1. The combination with a liquid tank, of a heating and discharge member for the contents thereof, contained within said tank and comprising a casing disposed therein and open at one end to the contents of the tank, a distributor element disposed within the said casing and embodying a tubular member open at both ends, the inner end being in free communication with the interior of the said casing and the outer end extending through an adjacent wall of the tank for external connection, and a heating means surrounding the tubular member.

2. The combination with a liquid tank, of a heating and discharge member for the contents thereof, contained within said tank and comprising a casing disposed along the bottom of the tank adjacent a wall thereof and open at one end to the contents thereof, a distributor element, means to space the same substantially axially within said casing to afford a cylindrical passageway for the contents of the tank, said distributing element embodying a tubular member open at both ends, the inner end being in free communication with the interior of the said casing and the outer end extending through an adjacent wall of the tank for external connection, and a steam jacket surrounding the tubular member.

In testimony whereof I affix my signature.

ALFRED F. SCHUMANN.